United States Patent [19]

Robertson

[11] Patent Number: 4,483,359
[45] Date of Patent: Nov. 20, 1984

[54] PULL AWAY SPILL GUARD

[75] Inventor: Harry G. Robertson, Blue Island, Ill.

[73] Assignee: Railhead Corp., Evergreen Park, Ill.

[21] Appl. No.: 424,068

[22] Filed: Sep. 27, 1982

[51] Int. Cl.³ .............................................. F16K 13/04
[52] U.S. Cl. .................................. 137/68 R; 137/616;
285/2; 285/3; 251/149.6
[58] Field of Search .................. 137/68 R, 616; 285/2,
285/3; 251/149.6

[56] References Cited

U.S. PATENT DOCUMENTS

| | | | |
|---|---|---|---|
| 2,048,388 | 7/1936 | Johnsen | 137/68 R |
| 2,910,080 | 10/1959 | Wright | 137/68 R X |
| 3,512,317 | 5/1970 | Lynch | 137/68 R X |
| 3,542,047 | 10/1970 | Nelson | 137/68 R |
| 3,741,521 | 6/1973 | Tatsuno | 137/68 R X |
| 4,232,697 | 11/1980 | Meisenheimer | 137/68 R |

Primary Examiner—Harold W. Weakley

[57] ABSTRACT

A pull away spill guard comprising an automatic shut-off valve positioned in a supply line used in transferring liquids from one container to another. The valve acts to automatically shut off the flow of liquid through the system if the system becomes accidentally over-pressurized or there is a separation or disrupting movement in the system operating between the two tanks.

1 Claim, 9 Drawing Figures

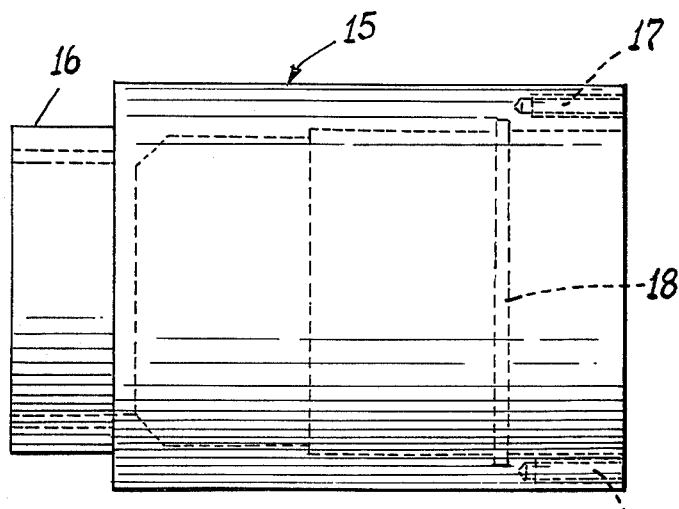
FIG. 4.
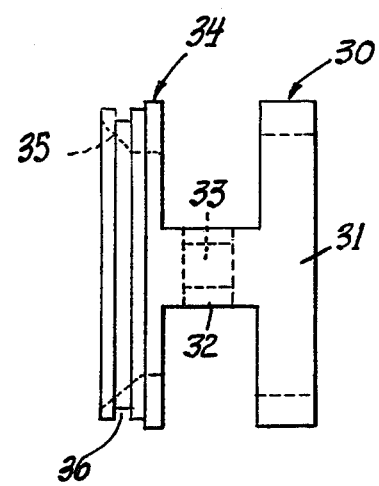
FIG. 6.
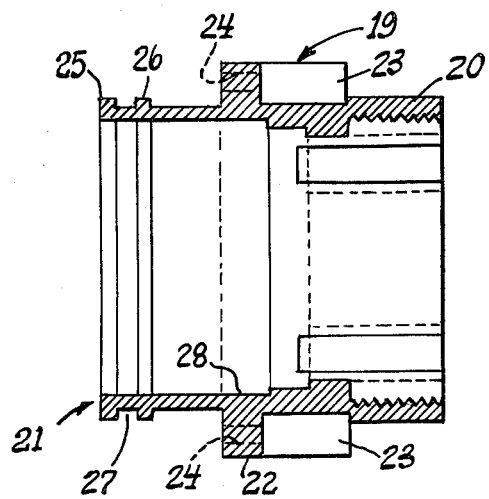
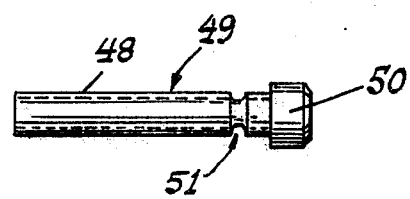
FIG. 7.
FIG. 5.
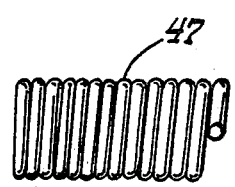
FIG. 8.
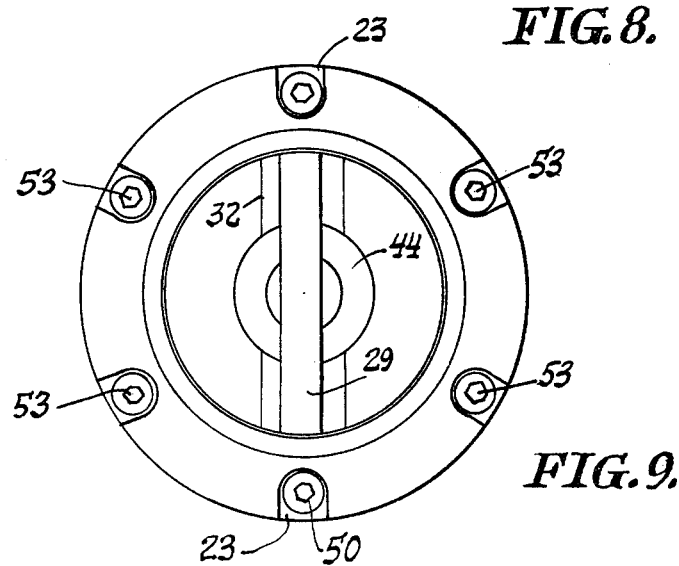
FIG. 9.

PULL AWAY SPILL GUARD

SUMMARY OF THE INVENTION

The object of this invention is to provide a pull away spill guard in the form of an automatic shut-off valve which is positioned in the supply line through which fluids are caused to flow. The valve is spring biased and is mounted in its open condition during normal operation.

The pull away spill guard of this invention consists of a two part valve housing which is connected together in axial alignment and in cooperating relation so as to maintain the valve within the housing in an open condition. Each section of the housing is fixedly connected to confronting ends of a fluid supply line with the sections of the housing held together by break away fasteners. These fasteners are pretested to determine the amount of force necessary to cause separation and resulting closure of the valve within the valve housing.

During the transfer of highly combustible liquids, such as an example diesel fuel, from a storage tank to a vehicle tank, it is imperative that the discharge flow of such fluid through the piping system be interrupted when accidental separation of the piping system between fluid storage tank and the receiving container occurs. In filling a tank transporter or the diesel engine of a locomotive with fluids from a storage tank, accidental movement of the transporter or locomotive may occur causing accidental rupture of the piping system, whereby large volumes of combustible fluids are spilled upon the ground, creating a highly dangerous and undesirable condition. It is the purpose of this invention to prevent such accidental spillage of such liquids.

The pull away spill guard of this invention is highly efficient in use and economical in manufacture, and is simple in installation requiring no special tools.

DESCRIPTION OF THE DRAWINGS

The invention will be best understood by reference to the accompanying drawings showing the preferred embodiment of the invention by which the stated objects are achieved, and, in which:

FIG. 4 is a sectional view of one part of the valve housing;

FIG. 5 is a sectional detailed view of the removable insert part of the valve housing;

FIG. 6 is a sectional view of the valve block of this invention;

FIG. 7 is a view of the break away connector used in this invention;

FIG. 8 is a view illustrating the insert helicoil used in this invention; and

FIG. 9 is an end elevational view of the pull away spill guard.

GENERAL DESCRIPTION

Figure 1:
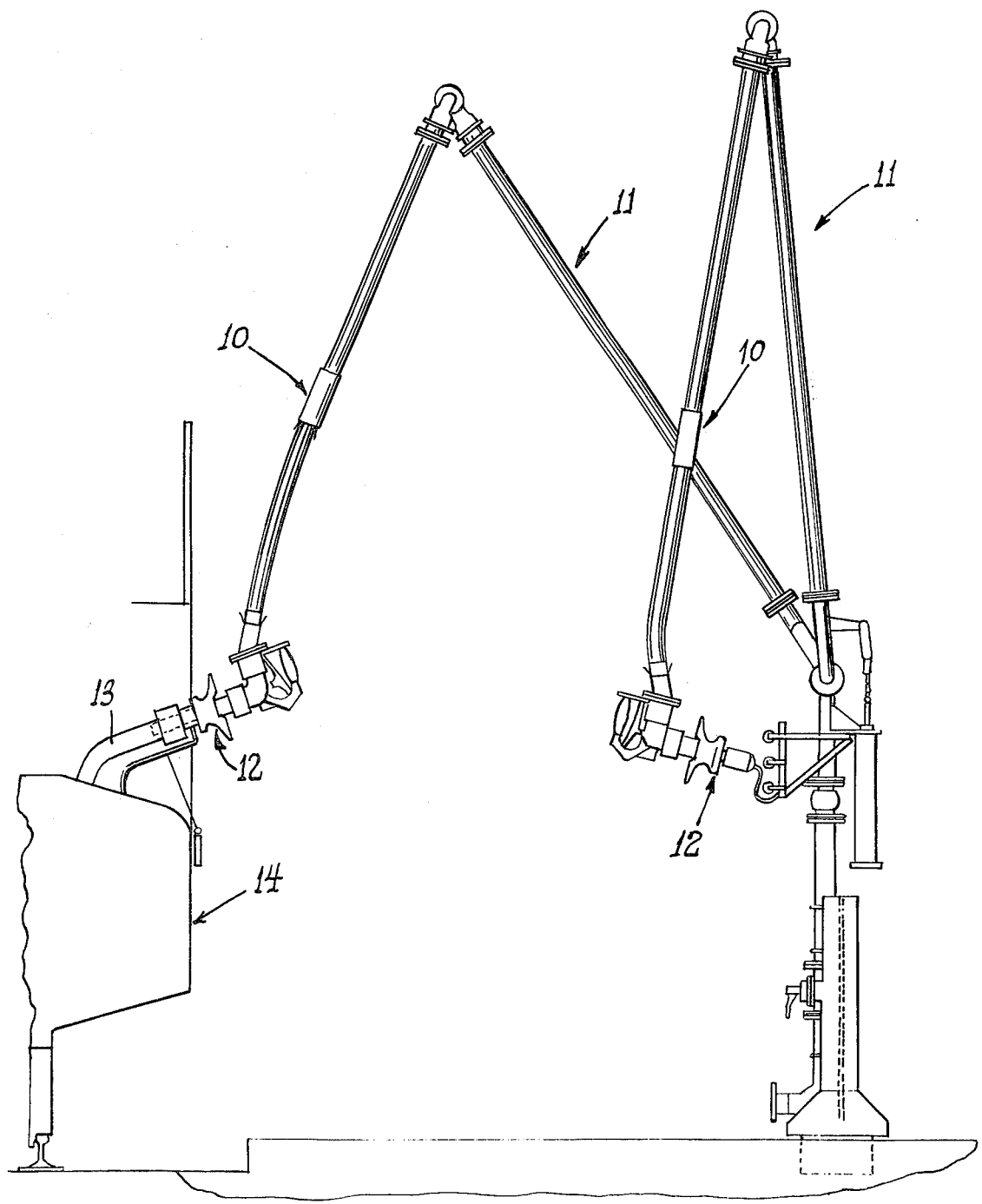
FIG. 1 is a schematic view showing the embodiment of the invention in a fluid dispensing system.

As illustrated in FIG. 1 the pull away spill guard 10 is incorporated in a liquid dispensing crane system 11 which includes a dispensing nozzle 12 that is releasable clamped into a fuel intake 13 of a diesel locomotive 14. It is during this fuel loading operation that accidental movement of the diesel locomotive may take place causing breakage in the supply line, which, in turn, would permit spillage of the diesel fuel. The present invention overcomes this accidental spilling of the fuel.

The pull away spill guard 10 includes a housing comprising a first cylindrical case 15 having at one end a reduced internally threaded inlet opening 16. FIG. 4 shows that the opposite end of the case 15 has formed in the end wall surface surrounding the center bore a plurality of coaxially extending holes 17. Inwardly from the base of the holes 17 and formed in the peripheral wall of the center bore of the case 15 is an annular groove 18.

The pull away spill guard includes a second circular case 19 which at one end provides an internally threaded outlet opening 20, as seen in FIG. 5.

Figure 2:
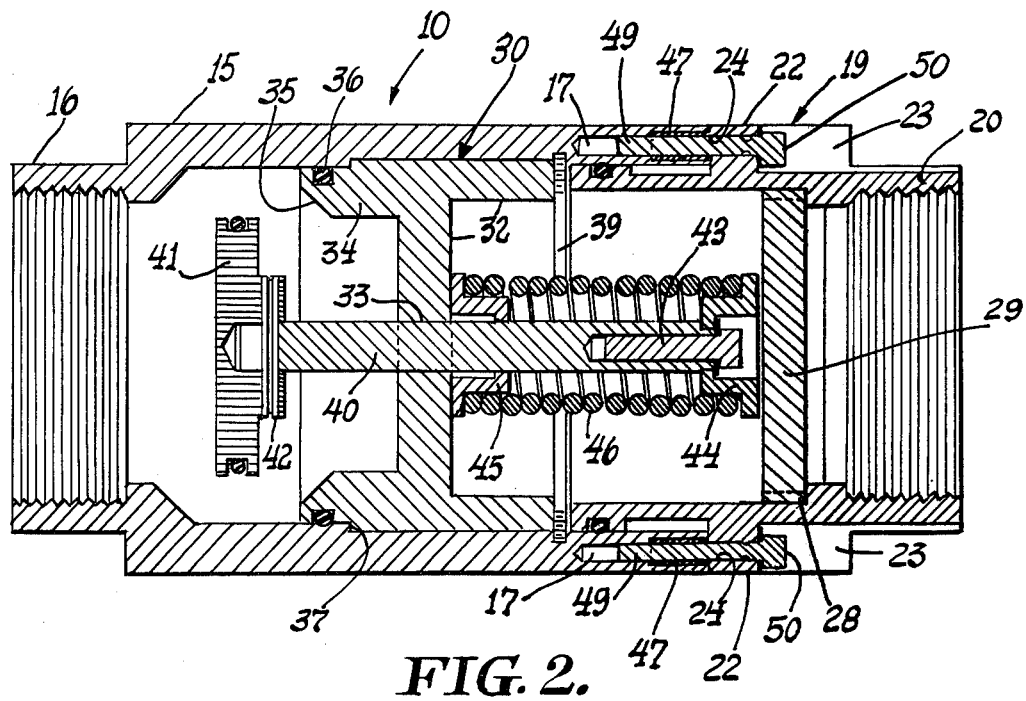
FIG. 2 is a detailed sectional view of the pull away spill guard of this invention in its valve open position.
Figure 3:
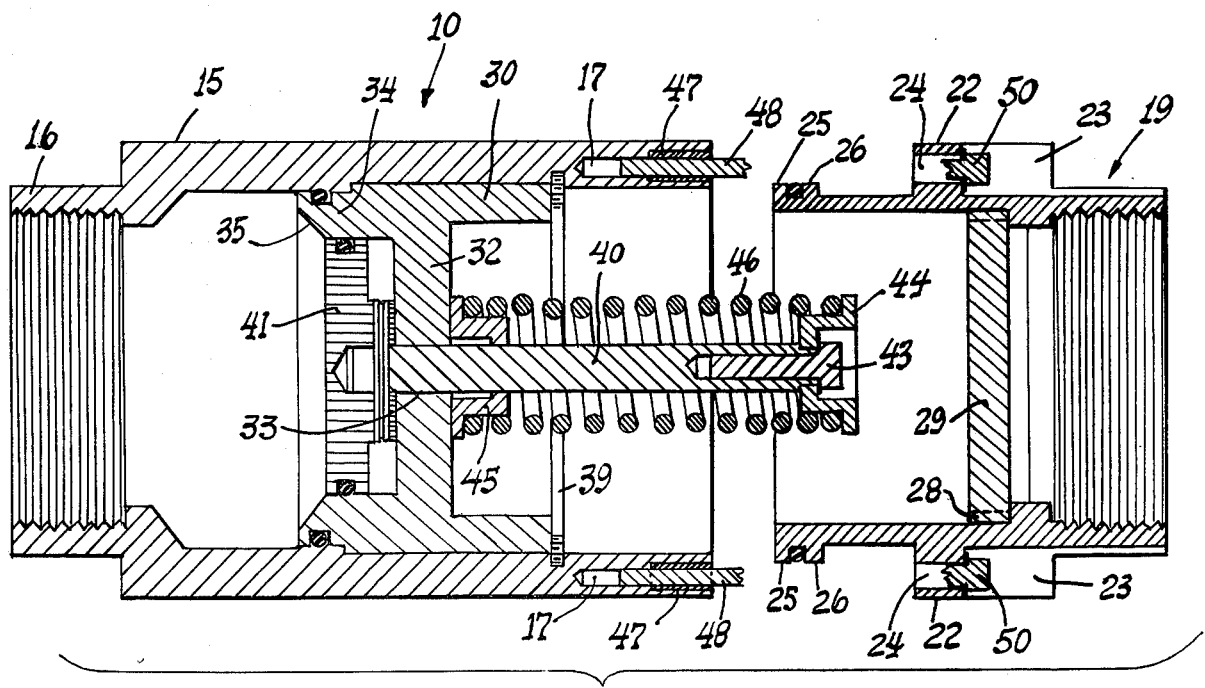
FIG. 3 is a detailed sectional view of the pull away spill guard showing the valve in its closed position.

It should be noted that the case 19 is provided with an insert end 21 which has a diameter such that it can be readily positioned within the center bore of case 15 as seen in FIGS. 2 and 3. The case 19 is provided with an annular flange 22, the outer diameter of which is equal to the outer diameter of case 15. This flange 22 is partially relieved as at 23 with the remaining portion of the flange 22 having passages 24 formed therethrough, which will be axially aligned with the holes 17 formed in the case 15, when the two parts are in an assembled relation as shown in FIGS. 2 and 3.

The insert end 21 of the case 19 is provided with two spaced apart annular flanges 25 and 26 which form therebetween a seat 27 for a sealing "O" ring. The diameter of the flanges 25 and 26 are equal to the inner diameter of the case 15 so that they may be readily received therein.

The internal wall of the case 19 intermediate its ends provides a stepped shelf 28 which is adapted to receive an elongated rectangularly shaped bar brace 29.

A circular valve block 30 is positioned within the center bore of the case 15. This valve block 30, as depicted in FIG. 6, consists of a double ring 31 and an elongated rectangular shaped bar 32 extending between and through the diameter of the rings 31. The bar 32 is provided with a circular opening 33 positioned coaxially of the center line extending through the cases 15 and 19, as clearly shown in FIGS. 2 and 3.

The forward ring 34 of the block 30 has its inner peripheral wall tapered as at 35 so as to provide an enlarged end opening directed toward the inner bore of the case 15 adjacent to the outlet opening 16. The peripheral wall adjacent to the forward ring 34 of the block 30 is grooved as at 36 to provide a seat for a sealing "O" ring.

To properly locate the valve block 30 within the center bore of the casing 15, the internal wall of the casing 15 provides an internal shoulder 37 which will engage a radially extending edge of the peripheral wall of the ring 34, formed by a stepped reduction in the diameter of the forward end of the block 30. To maintain the valve block 30 in its properly seated position with the case 15, the annular groove 18 formed in the inner peripheral wall of the casing 15 is adapted to receive a split retainer spring ring 39. As illustrated in FIG. 2 the spring ring 39 will also bear against the insert edge of the case 19 when the valve is in its assembled condition.

Adapted to be freely journalled in the aperture 33 formed in the bar 32 of the ring 31 is the piston 40 of a valve structure. Within the inner bore of the case 15, adjacent to the outlet 16, is a circular valve head 41. By a suitable pin 41 the valve head 41 is connected to the forward end of the piston 40. The opposite end of the piston 40 has connected thereto, by a screw 43, a collar 44. A like collar 45 is positioned against the bar 32 of ring 31 in a confronting relation to collar 44. Positioned between the collars 44 and 45 and embracing a portion of the piston 40 is a coil spring 46. The coil spring 46 in its normal expanded condition will cause the valve head 41 to be seated within the valve seat provided by the valve block 30, as is illustrated in FIG. 3.

When the pull away spill guard is assembled and the case 19 is inserted in one end of the case 15, the method of releasably securing the parts together is as follows. Within the holes 17 formed in the wall of the casing 15 is inserted a helicoil 47. These helicoils 47 are adapted to receive the hollow circular shank 48 of failure pins 49. The failure pins 49 are clearly shown in FIG. 7, and as such provide a hex socket cap 50 and the elongated hollow shank 48. A portion of the shank 48 is weakened as at 51 so that upon a predetermined amount of linear stress the cap 50 will break away from the shank 48.

In assembling the apparatus the following procedure is followed. The valve head 41 is connected to one end of the piston 40. The piston 40 is then journalled in the center opening of the valve block 32 and through the collar 45. The coil spring 46 embraces the piston 40 and the confronting collar 44 is connected to the opposite end of the piston 40. By this arrangement the piston and valve head are now mounted onto the valve block 42.

The valve block 42 is then inserted in the case 15 through its outlet side until the block 30 engages the shoulder 37 formed on the inner peripheral wall of the case 15. An "O" ring has been positioned in groove 36 formed in valve block 30 so as to seal the connection between it and the casing 15. The split retainer spring ring 39 is then caused to be seated in the annular groove 18 and it in turn will secure the valve block 30 within the casing 15.

The bar brace 29 is inserted into the case 19 and may be attached thereto, such as by welding or the like. An "O" ring is placed between the flanges 25 and 26 provided by the case 19.

Each case 15 and 19 is then threadably connected to a pipe section bearing in mind that the case 15 is on the inlet side of the system while case 19 must be positioned on the outlet side of the piping system. Case 19 is then inserted in the case 15 and the bar force 29 will act upon the piston 40 against the normal action of the spring 46 and open the valve. The two casings are initially connected together by a number of arming screws 53 (see FIG. 9) when both casings are in total contact with each other the failure pins 49 are then installed making sure that they are not under undue stress. The arming screws 53 are then removed with the failure pins 49 remaining as the sole connecting means between the two cases.

When the apparatus is assembled, as hereinbefore described, the bar brace 29 will have engaged the collar 44 and compressed the spring 46 against the fixed collar 45. The piston 40 will have been moved axially through the housing so as to displace the valve head 41 from the valve seat provided by the valve block 30.

In such a condition the liquid can freely pass through the device. However, should there by exerted any linear force in the downstream direction of the flowing liquids, upon the housing or through the hose connected thereto, such force when it reaches a predetermined degree will cause the failure pins 49 to break away effecting separation of case 19 from case 15. When the case 19 separates it will remove the bar brace 29 from beneath the collar 44 which will permit the compressed coil spring 46 to expand with a resulting movement of the piston 40 through the valve block 32 and the seating of the valve head 41 in the valve seat provided thereby. The sealing of the valve head 41 is aided by the then built up pressure of liquids thereagainst as they are introduced through the inlet end of the case 15. The above-described condition is clearly illustrated in FIG. 3. As shown, the pull away spill guard has functioned to prevent accidental discharge of the liquids through the valve.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described my invention what I claim as new and desire to protect by Letters Patent is:

1. A pull away spill guard incorporated in a liquid transferring system comprising;
   (a) a two piece circular housing including an inlet case and an outlet case having a diameter less than said inlet case so as to have a portion thereof insertable therein,
   (b) an annular flange on the periphery of said outlet case having a diameter equal to that of said inlet case and providing a confronting annular surface limiting the insertion into said inlet case,
   (c) a circular valve block within said inlet case providing a valve seat,
   (d) means retaining said valve block within said inlet case intermediate its ends without restricting the flow of said liquid through said case,
   (e) a valve member including a valve head mounted on one end of a valve piston, with said piston freely journalled through said valve block and being of a length to position said head within said inlet case and with its opposite end outwardly of the outlet side of said inlet case,
   (f) a spring embracing said piston between said valve block and said opposite end of said piston for normally seating said valve head upon said valve seat and said opposite end of said piston outwardly of the inlet case,
   (g) a fixed elongated member within said outlet case and extending diametrally thereto and movable therewith when said outlet case is inserted into and attached to said inlet case for releasably contacting said opposite end of said piston to move the same and said valve head axially through said valve block against the action of said spring to open said inlet case to flow of liquids therethrough when said outlet case is inserted in and connected to said inlet case,
   (h) external breakaway means extending coaxially of the center line of the said housing comprising threaded pins having deformed shank portions with the pins journalled through said peripheral annular flange of said outlet case and into helicoils contained in aligned openings formed in the annular confronting surface provided by said inlet case for releaseably connecting said outlet case to said inlet case with said valve head displaced from said valve seat during the absence of a pre-determined linear force upon either case in either direction.

* * * * *